US012595751B1

(12) United States Patent
Lee et al.

(10) Patent No.: US 12,595,751 B1
(45) Date of Patent: Apr. 7, 2026

(54) JET-PROPELLED ENGINE USING DISCHARGED EXHAUST GAS

(71) Applicants:Jae-Chang Lee, Hwaseong-si (KR); So Jung Lee, Yongin-si (KR); Jung Hoon Lee, Seoul (KR)

(72) Inventors: Jae-Chang Lee, Hwaseong-si (KR); So Jung Lee, Yongin-si (KR); Jung Hoon Lee, Seoul (KR)

( * ) Notice: Subject to any disclaimer, the term of this patent is extended or adjusted under 35 U.S.C. 154(b) by 302 days.

(21) Appl. No.: 18/272,600

(22) PCT Filed: Jan. 12, 2022

(86) PCT No.: PCT/KR2022/000588
§ 371 (c)(1),
(2) Date: Jul. 17, 2023

(87) PCT Pub. No.: WO2022/158788
PCT Pub. Date: Jul. 28, 2022

(30) Foreign Application Priority Data

Jan. 19, 2021  (KR) ........................ 10-2021-0007664
Jul. 1, 2021  (KR) ........................ 10-2021-0086668

(51) Int. Cl.
| | |
|---|---|
| *F01D 25/30* | (2006.01) |
| *F02K 1/78* | (2006.01) |
| *F02K 3/062* | (2006.01) |
| *F02K 7/16* | (2006.01) |

(52) U.S. Cl.
CPC ................ *F01D 25/30* (2013.01); *F02K 1/78* (2013.01); *F02K 3/062* (2013.01); *F02K 7/16* (2013.01)

(58) Field of Classification Search
CPC ... F01D 25/30; F02K 1/04; F02K 1/78; F02K 1/82; F02K 3/062; F02K 7/16
See application file for complete search history.

(56) References Cited

U.S. PATENT DOCUMENTS

| | | | | |
|---|---|---|---|---|
| 2004/0159108 A1* | 8/2004 | Lee | ............................ | F02K 7/16 60/804 |
| 2005/0226728 A1* | 10/2005 | Charrier | .................. | F01D 5/027 416/144 |
| 2012/0167550 A1 | 7/2012 | Oechsle et al. | | |

FOREIGN PATENT DOCUMENTS

| | | |
|---|---|---|
| JP | 2004-251146 A | 9/2004 |
| JP | 2005-299651 A | 10/2005 |
| JP | 2012-140960 A | 7/2012 |
| JP | 5896449 B2 | 3/2016 |
| KR | 10-2003-0009113 A | 1/2003 |

OTHER PUBLICATIONS

English translation of JP2004251146 (Year: 2004).*
English translation of JP5896449 (Year: 2016).*
International Search Report for PCT/KR2022/000588 mailed Apr. 22, 2022 from Korean Intellectual Property Office.

* cited by examiner

*Primary Examiner* — Scott J Walthour
(74) *Attorney, Agent, or Firm* — Revolution IP, PLLC

(57) ABSTRACT

A jet-propelled engine using discharged exhaust gas, includes: a body; a combustor installed in the body so as to spray fuel to compressed air and combust the fuel; a guide member for guiding exhaust gas, discharged from the combustor, in a predetermined direction; and a propulsive force providing means for providing propulsive force by colliding with the exhaust gas guided from the guide member, wherein one propulsive force providing means is provided at the rear side of the guide member.

11 Claims, 7 Drawing Sheets

(a)

(b)

(a)

(b)

JET-PROPELLED ENGINE USING DISCHARGED EXHAUST GAS

TECHNICAL FIELD

This application claims priority of Korean Patent Application No. 10-2021-0007664, filed on Jan. 19, 2021 and Korean Patent Application No. 10-2021-0086668, filed on Jul. 1, 2021 in the Korean Intellectual Property Office, the disclosures of which are incorporated herein by reference.

The present invention relates to a jet propulsion engine using discharged exhaust gas, and more particularly, to a jet propulsion engine using discharged exhaust gas, such as a turbojet, a turbofan, and a ramjet, which have partially different specific operation methods and operation forms but have jet propulsion in common, capable of obtaining high thrust even in a supersonic range by rotating fan blades by exhaust gas ejected at supersonic speed or causing the exhaust gas to collide with a fixed vane.

BACKGROUND ART

In general, a jet propulsion engine refers to a heat engine that ejects high-temperature exhaust gas combusted in the engine through a jet nozzle and obtains a propulsive force with a reaction force thereto. Such a jet propulsion engine is often referred to as a jet engine, and jet engines are mostly used as prime movers for aircraft, and are classified into four types according to structures and functions.

First, a turbojet compresses air drawn from the atmosphere with an axial flow type or centrifugal compressor, introduces the compressed air into a combustor, and combusts the compressed air by injecting fuel, produces high-temperature, high-pressure combustion gas, ejects the combustion gas to a turbine stage for driving a compressor, and then drives the turbine stage. In this way, a propulsion engine for self-driving is formed, and thereafter, the exhaust gas passing through the turbine stage is ejected to the outside through a nozzle, so that a propulsive force is generated.

This engine receives a large amount of air to increase the durability of a turbine material, but of course, residual oxygen remains in the combustion gas, and therefore when a long tail pipe is installed and secondary fuel is injected there, an after-burning action occurs, and thus there is also a method of obtaining additional thrust by a simple method. However, this method consumes a lot of fuel and is noisy, and thus the method is not used except for supersonic military aircraft.

Next, there is a turboprop having a structure in which a huge propeller is mounted on a turbojet. This turboprop is similar to the turbojet, but because most of the combustion gas energy is used to drive the propeller, and the exhaust gas energy is released as it is, the turboprop does not gain thrust separately.

Next, there is a turbofan having a structure in which a fan is mounted on a turbojet. The turbofan is similar to the turbojet, but converts most of the combustion gas into a driving force of the fan and uses both thrust from the fan and jet thrust from a core engine. Its performance is intermediate between the turboprop and the turbojet, and it is used as an engine for medium-sized passenger aircraft and transport aircraft that do not require high-speed flight.

Another type of jet propulsion engine is a ramjet. As a flight speed increases, atmospheric air itself relatively introduced into the engine is compressed by a forward force of the engine, which is called the ram effect, and the ramjet introduces the compressed air obtained by the ram effect into a combustor, injects fuel to cause combustion and explosion, and then ejects the air through a nozzle, thereby obtaining thrust with a reaction force thereto.

In the currently known ramjet, there are only an empty compression chamber and combustor injection nozzles, but there are no rotating bodies such as turbines or compressors. Since this engine has a simple structure and its performance is better at higher speeds, the engine is used as a prime mover for supersonic passenger planes and missiles that travel 2 to 4 times the speed of sound. However, the ramjet has disadvantages of requiring external assistance during starting and high fuel consumption.

Technical Problem

Therefore, the technical aspects to be achieved by the present invention are to provide a jet propulsion engine using discharged exhaust gas, capable of minimizing losses that may occur during fan blade rotation, reducing resistance due to air friction, and increasing engine efficiency, thereby saving fuel and increasing speed.

Technical Solution

One aspect of the present invention provides a jet propulsion engine using discharged exhaust gas, including a body, a combustor installed in the body and configured to allow fuel to be injected to compressed air to combust the fuel, a guide member configured to guide exhaust gas discharged from the combustor in a predetermined direction, and a propulsive force providing means configured to provide a propulsive force by colliding with the exhaust gas guided from the guide member, and one propulsive force providing means is provided at a rear of the guide member.

In addition, the propulsive force providing means may include a rotating shaft and a fan blade coupled to the rotating shaft and rotating.

In addition, the guide member may have a curve formed toward a side of the body so that the exhaust gas is directed toward the side of the body, and the fan blade may have a curve formed in a direction opposite to the curve of the guide member so that the exhaust gas guided by the guide member collides with the fan blade and faces a rear of the body.

In addition, the fan blade may be formed to be more parallel to the rotating shaft toward the rear of the body.

In addition, the fan blade may be formed so that a width increases toward the rear of the body.

In addition, the jet propulsion engine may further include a counterweight coupled to the rotating shaft and rotating at a position facing the fan blade.

In addition, the propulsive force providing means may include an inner barrel installed in the body and a fixed vane fixed to the inner barrel.

In addition, the guide member may have a curve formed toward a side of the body so that the exhaust gas is directed toward the side of the body, and the fixed vane may have a curve formed in a direction opposite to the curve of the guide member so that the exhaust gas guided by the guide member collides with the fixed vane and faces a rear of the body.

In addition, the fixed vane may be formed to be more parallel to the inner barrel toward the rear of the body.

In addition, the fixed vane may be formed so that a width increases toward the rear of the body.

In addition, the jet propulsion engine may further include a turbine stage disposed at a rear of the combustor and rotating.

In addition, the turbine stage may include a high-pressure turbine stage rotating by the exhaust gas discharged from the combustor and a low-pressure turbine stage rotating by exhaust gas passing through the high-pressure turbine stage and coupled to the rotating shaft.

In addition, the jet propulsion engine may further include a compressor disposed in front of the combustor for forcibly compressing atmospheric air supplied to the combustor.

In addition, the jet propulsion engine may further include a compression chamber configured to naturally compress air introduced into the body by a forward force of the body.

In addition, the jet propulsion engine may include a gearbox provided on the guide member.

In addition, the jet propulsion engine may include a cover surrounding the gearbox.

Advantageous Effects

Accordingly, embodiments of the present invention have effects of minimizing losses that may occur during rotation of a fan blade, reducing resistance due to air friction, and increasing engine efficiency, thereby making it possible to save fuel and increase speed.

DESCRIPTION OF DRAWINGS

The following drawings attached to the specification illustrate preferred embodiments of the present invention by example, and serve to enable technical aspects of the present invention to be further understood together with detailed description of the invention given below, and therefore the present invention should not be interpreted only with matters in such drawings.

MODES OF THE INVENTION

Figure 1:
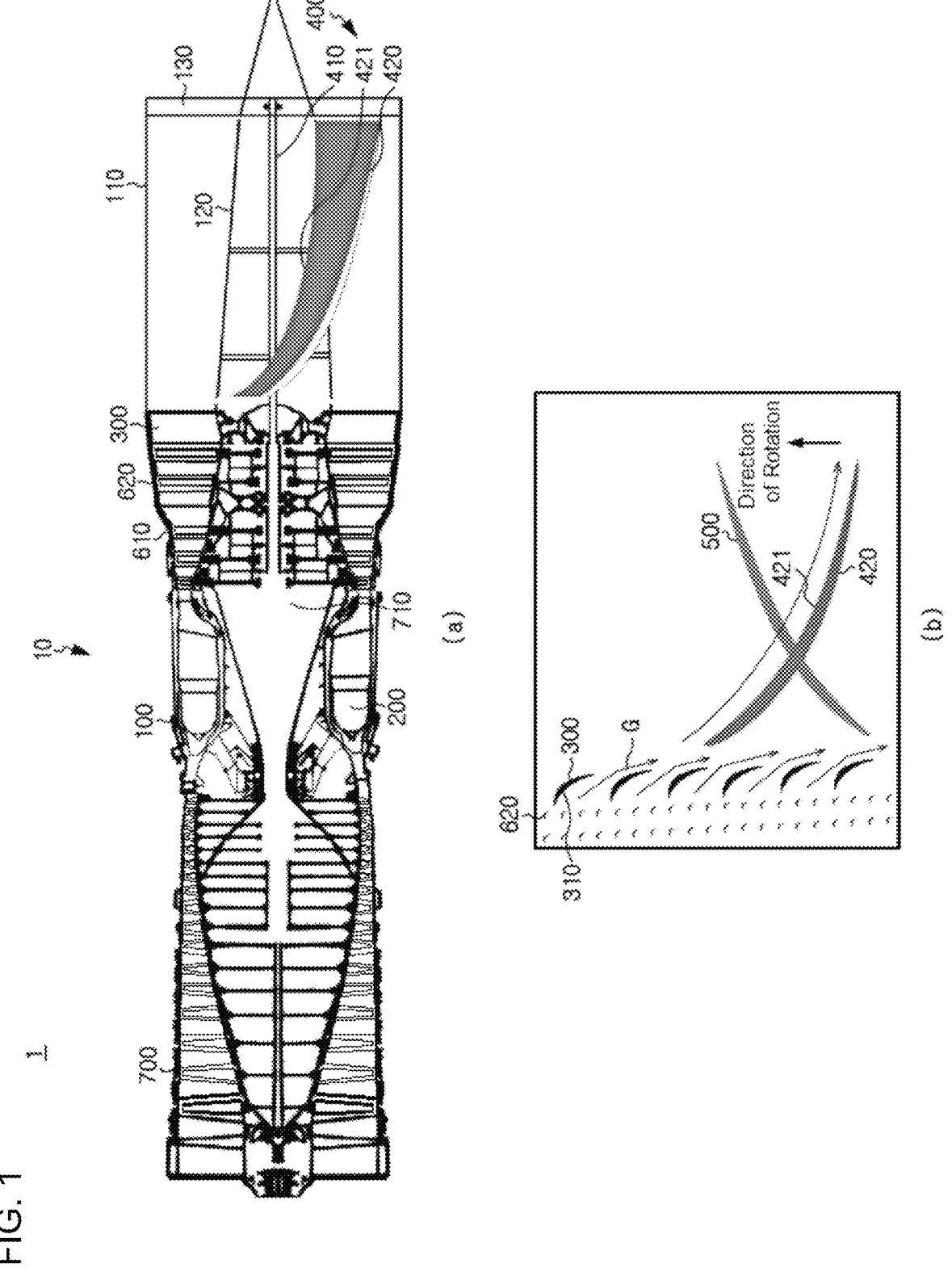
FIG. 1 shows (A) a cross-sectional view of a jet propulsion engine using discharged exhaust gas according to a first embodiment of the present invention, and (B) a view schematically showing a turbine stage, a guide member, a fan blade, and a counterweight in (A).

Hereinafter, preferred embodiments of the present invention will be described in detail with reference to the accompanying drawings. Terms or words used in this specification and claims should not be restrictively interpreted as ordinary meanings or dictionary-based meanings, but should be interpreted as meanings and concepts conforming to the technical aspects of the present invention on the basis of the principle that an inventor is allowed to properly define concepts of terms to describe his or her invention in the best ways. Therefore, embodiments described in the specification and configurations shown in the drawings are merely the most preferred embodiment of the present invention, but, are not intended to fully describe the technical aspects of the present invention, so it should be understood that a variety of other equivalents and modifications could be made thereto at the time of filing the application.

In the drawings, the size of each element or a specific portion constituting the element is exaggerated, omitted, or schematically shown for convenience and clarity of description. Thus, the size of each component may not entirely reflect the actual size. In the case where it is determined that the detailed description of the related known functions or constructions may unnecessarily obscure the gist of the present invention, such explanation will be omitted.

The term "combine" or "connect" as used in this specification may include not only to a case where one member and another member are directly combined or directly connected but also a case where one member is indirectly combined or indirectly connected to another member via a connecting member.

The present invention has been devised to solve the above-mentioned problems or disadvantages, and an object thereof is to provide a jet propulsion engine using discharged exhaust gas according to one embodiment in which a fan blade obtains thrust through rotation in lateral exhaust gas injected at supersonic speed and another embodiment in which thrust is obtained by installing a fixed vane such as a sail of a sailboat in lateral exhaust gas injected at supersonic speed.

A jet propulsion engine, commonly called a jet engine, means a heat engine that ejects high-temperature, high-pressure exhaust gas combusted in the engine from a jet nozzle and uses the reaction force thereto as a propulsive force, and it should be understood that the principles and features of the present invention described below can be applied to various heat engines such as a turbojet, a turbofan, a ramjet, and the like.

Figure 2:
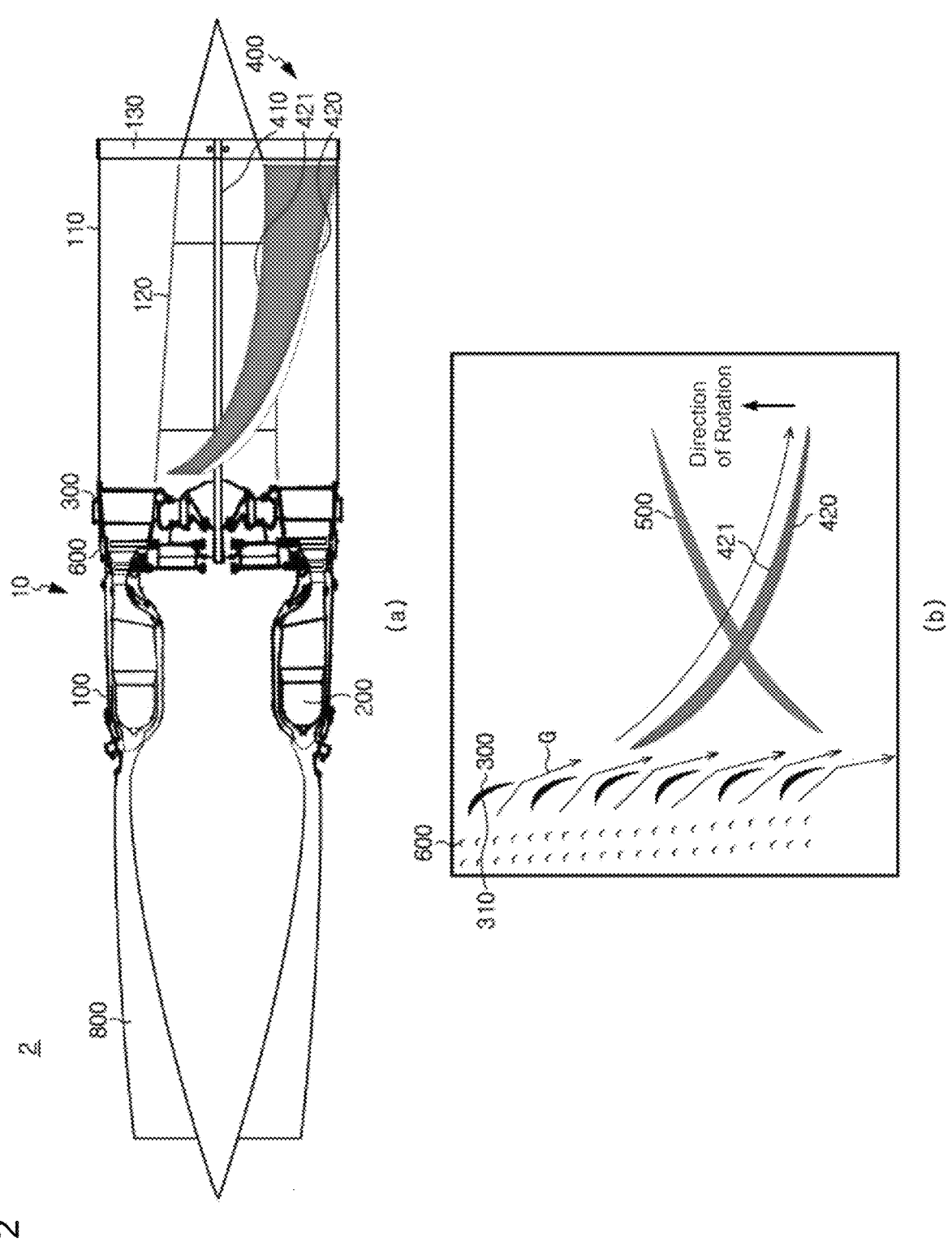
FIG. 2 shows (A) a cross-sectional view of a jet propulsion engine using discharged exhaust gas according to a second embodiment of the present invention, and (B) a view schematically showing a turbine stage, a guide member, a fan blade, and a counterweight in (A).
Figure 3:
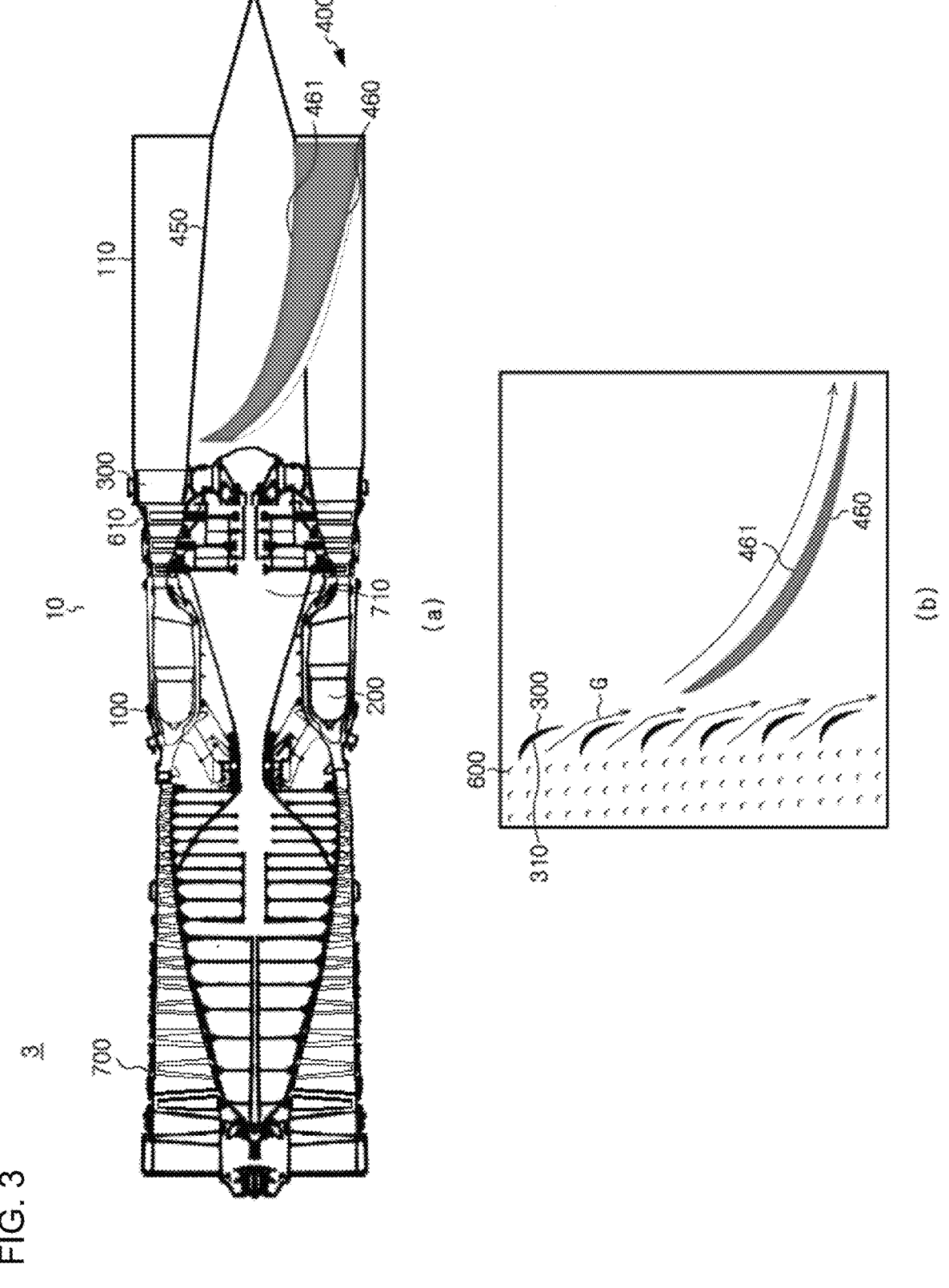
FIG. 3 shows (A) a cross-sectional view of a jet propulsion engine using discharged exhaust gas according to a third embodiment of the present invention, and (B) a view schematically showing a turbine stage, a guide member, and a fixed vane in (A).
Figure 4:
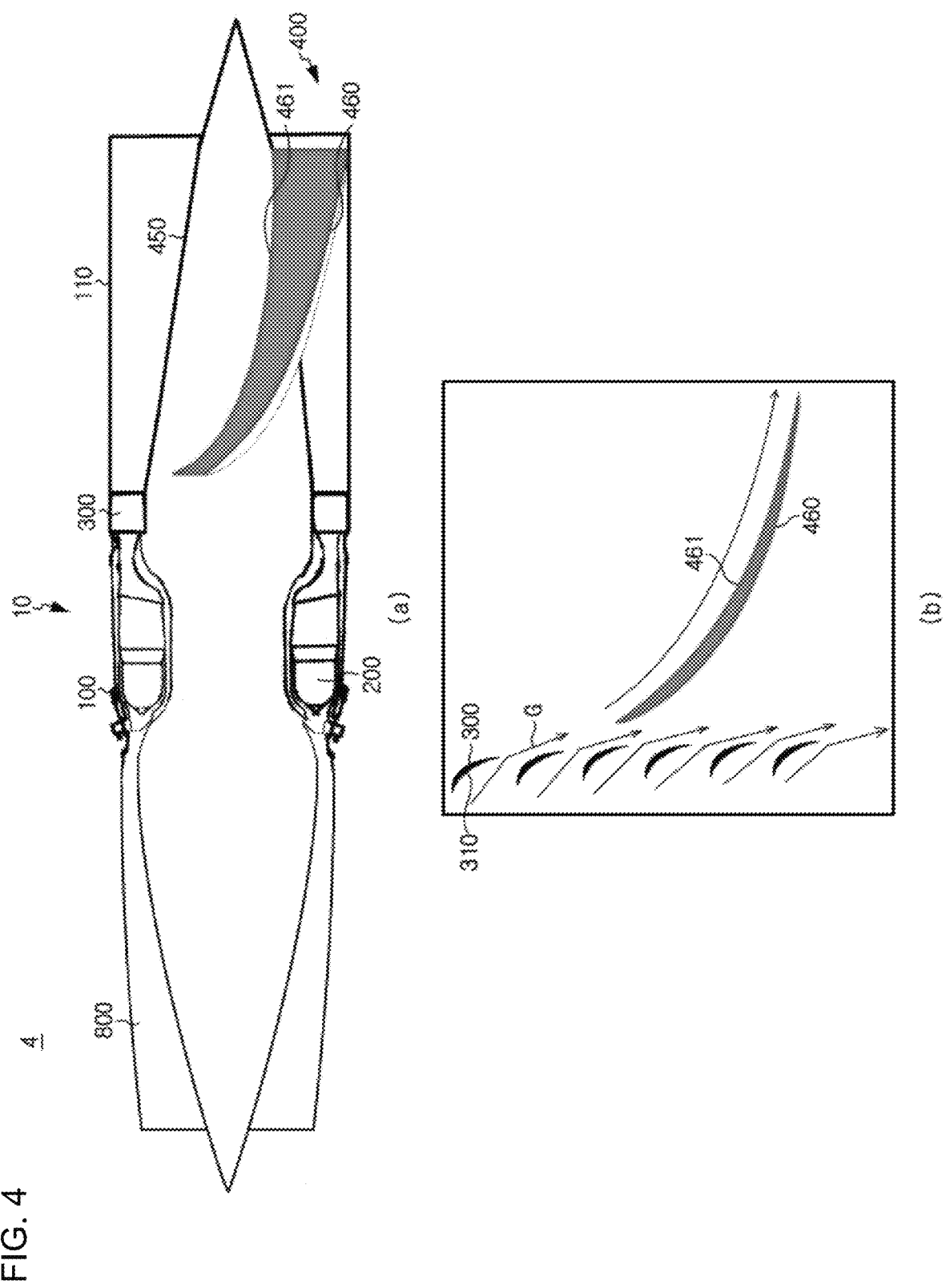
FIG. 4 shows (A) a cross-sectional view of a jet propulsion engine using discharged exhaust gas according to a fourth embodiment of the present invention, and (B) a view schematically showing a guide member and a fixed vane in (A).
Figure 5:
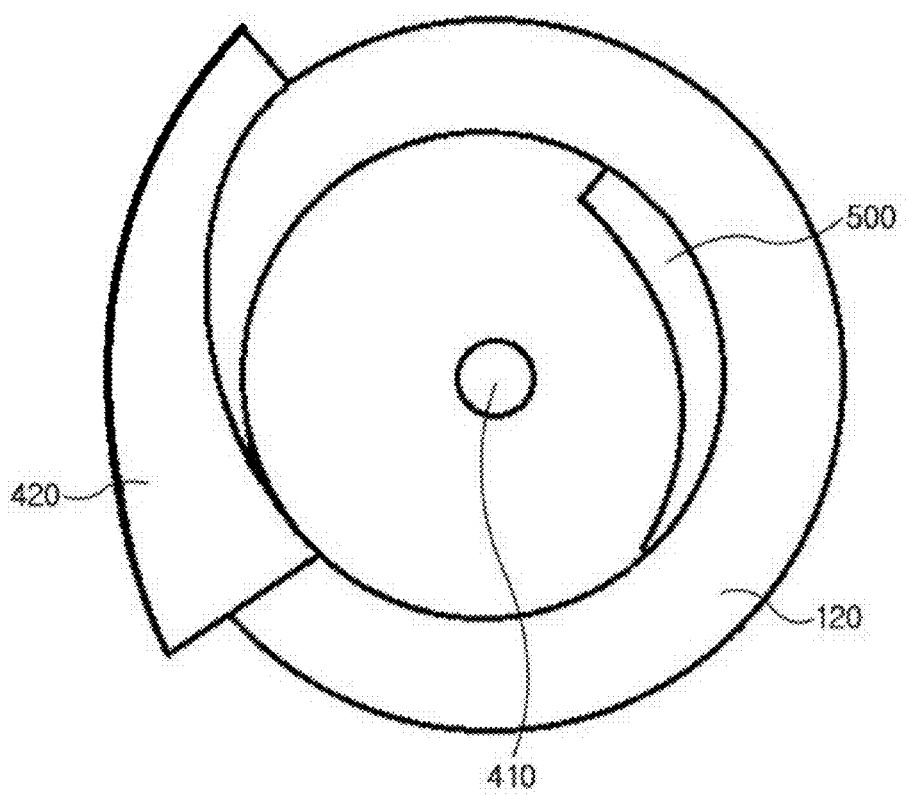
FIG. 5 is a view showing a state in which the fan blade and the counterweight provided in FIGS. 1 and 2 are installed.
Figure 6:
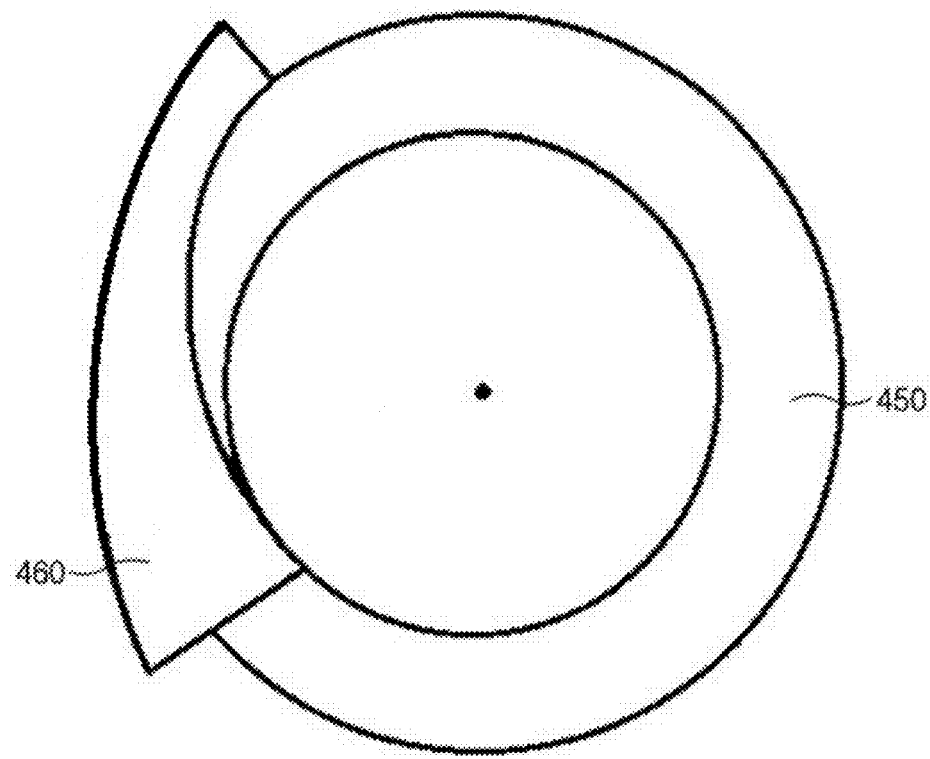
FIG. 6 is a view showing a state in which the fixed vane provided in FIGS. 3 and 4 is installed in an inner barrel.

FIG. 1A is a cross-sectional view of a jet propulsion engine using discharged exhaust gas according to a first embodiment of the present invention, FIG. 1B is a view schematically showing a turbine stage, a guide member, a fan blade, and a counterweight in FIG. 1A, FIG. 2A is a cross-sectional view of a jet propulsion engine using discharged exhaust gas according to a second embodiment of the present invention, FIG. 2B is a view schematically showing a turbine stage, a guide member, a fan blade, and a counterweight in FIG. 2A, FIG. 3A is a cross-sectional view of a jet propulsion engine using discharged exhaust gas according to a third embodiment of the present invention, FIG. 3B is a view schematically showing a turbine stage, a guide member, and a fixed vane in FIG. 3A, FIG. 4A is a cross-sectional view of a jet propulsion engine using discharged exhaust gas according to a fourth embodiment of the present invention, FIG. 4B is a view schematically showing a guide member and a fixed vane in FIG. 4A, FIG. 5 is a view showing a state in which the fan blade and the counterweight provided in FIGS. 1 and 2 are installed, FIG. 6 is a view showing a state in which the fixed vane provided in FIGS. 3 and 4 is installed in an inner barrel, FIG. 7A is a cross-sectional view of a jet propulsion engine using discharged exhaust gas according to a fifth embodiment of the present invention, FIG. 7B is a view schematically showing a turbine stage, a guide member, a gearbox, a fan blade, and a counterweight in FIG. 7A, FIG. 8A is a cross-sectional view of a jet propulsion engine using discharged exhaust gas according to a sixth embodiment of the present invention, and FIG. 8B is a view schematically showing a turbine stage, a guide member, a gearbox, a fan blade, and a counterweight in FIG. 8A.

A jet propulsion engine 10 using discharged exhaust gas according to one embodiment of the present invention relates to a jet propulsion engine 10 capable of maximizing engine efficiency through a propulsive force providing means 400 equipped with a fan blade 420 or a fixed vane 460, and hereinafter, the jet propulsion engine 10 using discharged exhaust gas according to one embodiment of the present invention will be described first, and then each embodiment of a form in which the jet propulsion engine 10 using discharged exhaust gas according to one embodiment of the present invention is coupled to an existing engine will be described.

Referring to the drawings, the jet propulsion engine 10 using discharged exhaust gas according to one embodiment of the present invention includes a body 100, a combustor 200, a guide member 300, and a propulsive force providing means 400.

The body 100 is protected by installing the combustor 200, the guide member 300, and the propulsive force providing means 400. A shape of the body 100 may be modified in various forms depending on the type of engine and necessary parts, and is formed in a substantially cylindrical shape in which external air is introduced through the front and exhaust gas is discharged to the rear. However, the shape of the body 100 is not limited thereto.

The body 100 may include a casing 110 and an outer frame 130, and the propulsive force providing means 400 to be described below may be installed in the casing 110, and the outer frame 130 may be coupled to a rear of the casing 110.

The combustor 200 is installed in the body 100. The combustor 200 provides a space in which compressed air may be mixed with fuel and combusted. In addition, the air and fuel combusted in the combustor 200 are ejected toward the rear as high-temperature, high-pressure exhaust gas.

The guide member 300 is provided to guide the exhaust gas discharged from the combustor 200 in a preset direction. Referring to FIGS. 1 to 4, the guide member 300 may be provided with a curve 310 formed toward the side of the body 100 so that the exhaust gas is directed toward the side of the body 100.

The propulsive force providing means 400 is provided to provide a propulsive force by colliding with the exhaust gas guided by the guide member 300 (see G in FIGS. 1 to 4). Here, referring to FIGS. 1 to 4, one propulsive force providing means 400 may be provided at the rear of the guide member 300.

The propulsive force providing means 400 may be variously provided, and in one embodiment may include a rotating fan blade 420 (see FIGS. 1 and 2), and in another embodiment may include a fixed vane 460 (see FIGS. 3 and 4). Here, the fan blade 420 and the fixed vane 460 may have a common basic shape, but are not limited thereto. The fan blade 420 and the fixed vane 460 are different in that the fan blade 420 is coupled to a rotating shaft 410 and rotates, but the fixed vane 460 is coupled to an inner barrel 450 and fixed.

First, with reference to FIGS. 1 and 2, a case in which the propulsive force providing means 400 includes the fan blade 420 will be described as one embodiment.

The propulsive force providing means 400 may include the rotating shaft 410 and the fan blade 420.

The rotating shaft 410 is rotatably installed inside the body. In addition, the fan blade 420 is provided to be coupled to the rotating shaft 410 and rotate. Here, the rotating shaft 410 and the fan blade 420 may be provided to rotate by a turbine stage 600, for example, a low-pressure turbine stage 620.

Meanwhile, referring to FIGS. 1B and 2B, as described above, in the guide member 300, the curve 310 may be formed toward the side of the body 100, and in this case, in the fan blade 420, a curve 421 may be formed in a direction opposite to the curve 310 of the guide member 300, so that exhaust gas G guided by the guide member 300 collides with the fan blade 420 and faces the rear of the body 100.

In addition, the fan blade 420 may be formed to be more parallel to the rotating shaft 410 toward the rear of the body 100. That is, the fan blade 420 may have the curve 421 formed in the direction opposite to the curve 310 of the guide member 300, and may be formed to be more parallel to the rotating shaft 410 toward the rear of the body 100. In addition, the fan blade 420 may be formed so that a width in a vertical direction increases toward the rear of the body 100.

By this form, as the exhaust gas injected from the combustor 200 is deflected toward the side of the body 100 by the guide member 300, the speed of the exhaust gas increases, so that the exhaust gas efficiently collides with the fan blade 420. Here, there is an effect of obtaining an additional propulsive force by the fan blade 420 in addition to the basic jet propulsive force by an impact force generated by colliding with the fan blade 420.

Referring to FIGS. 1, 2, and 5, a counterweight 500 is coupled to the rotating shaft 410 and rotates at a position facing the fan blade 420. Since vibration is generated due to weight imbalance when one fan blade rotates alone, in order to prevent such vibration, the counterweight 500 may be provided to be coupled to the rotating shaft 410 and rotate at the position facing the fan blade 420.

Here, referring to FIG. 5, the fan blade 420 may be installed on an outer surface of a rotor 120 and the counterweight 500 may be installed on an inner surface of the rotor 120 opposite to the fan blade 420.

Figure 7:
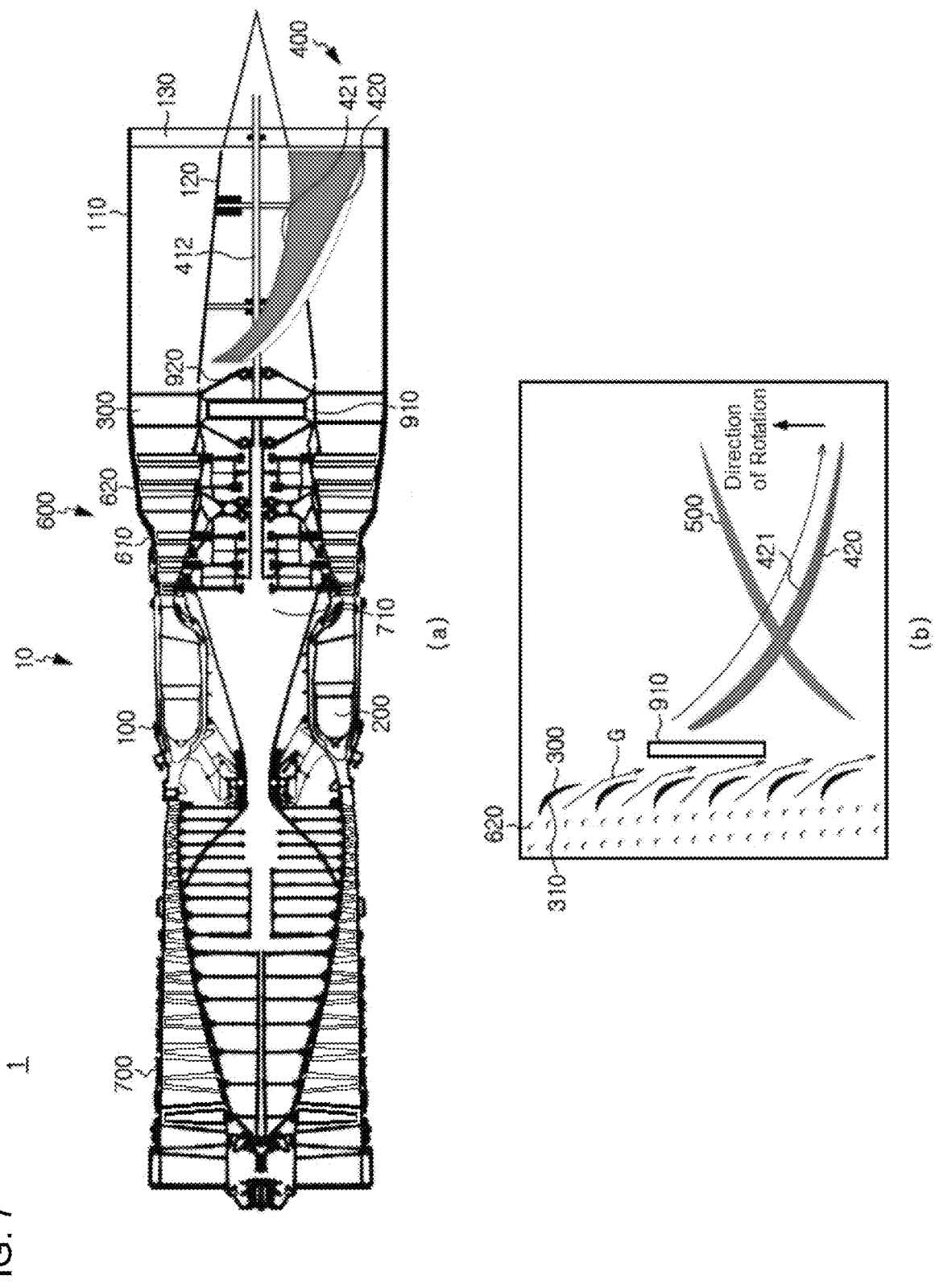
FIG. 7 shows (A) a cross-sectional view of a jet propulsion engine using discharged exhaust gas according to a fifth embodiment of the present invention, and (B) a view schematically showing a turbine stage, a guide member, a gearbox, a fan blade, and a counterweight in (A).
Figure 8:
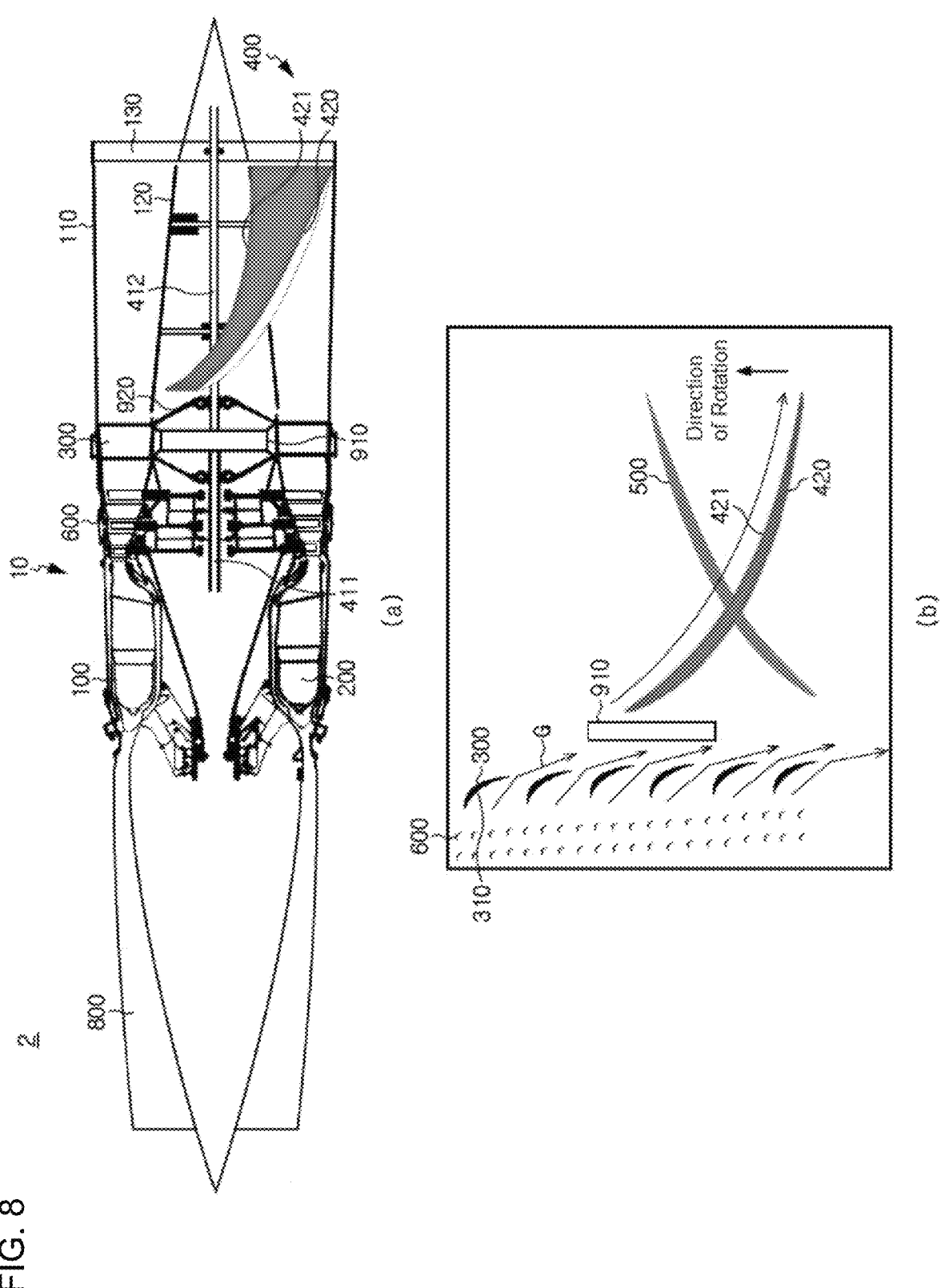
FIG. 8 shows (A) is a cross-sectional view of a jet propulsion engine using discharged exhaust gas according to a sixth embodiment of the present invention, and (B) a view schematically showing a turbine stage, a guide member, a gearbox, a fan blade, and a counterweight in (A).

Referring to FIGS. 7 and 8 as another embodiment, a gearbox 910 may be provided on the guide member 300. Here, a cover 920 is formed to surround the gearbox 910 to protect the gearbox 910. For example, the cover 920 in the form of an empty space may be provided at a center of the guide member 300, and the gearbox 910 may be installed in the cover 920.

Further, the gearbox 910 may be installed between the turbine stage 600 and the propulsive force providing means 400, thereby increasing a rotational speed of the propulsive force providing means 400.

Here, one side of the gearbox 910 may be connected to a first rotating shaft 411 coupled to the turbine stage 600, and the other side of the gearbox 910 may be connected to a second rotating shaft 412 coupled to the propulsive force providing means 400.

That is, the first rotating shaft 411 may be provided to connect the turbine stage 600 and the gearbox 910, and the second rotating shaft 412 may be provided to connect the propulsive force providing means 400 and the gearbox 910.

Next, with reference to FIGS. 3 and 4, a case in which the propulsive force providing means 400 includes the fixed vane 460 will be described as another embodiment.

The propulsive force providing means 400 may include the inner barrel 450 and the fixed vane 460.

The inner barrel 450 is fixedly installed in the body 100. In addition, the fixed vane 460 is coupled and fixed to the inner barrel 450.

Meanwhile, referring to FIGS. 3 and 4, as described above, in the guide member 300, the curve 310 may be formed toward the side of the body 100, and in this case, in the fixed vane 460, a curve 461 may be formed in a direction opposite to the curve 310 of the guide member 300 so that the exhaust gas G guided by the guide member 300 collides with the fixed vane 460 and faces the rear of the body 100.

In addition, the fixed vane 460 may be formed to be more parallel to the inner barrel 450 toward the rear of the body 100. That is, the fixed vane 460 may have the curve 461 formed in the direction opposite to the curve 310 of the guide member 300, and may be formed to be more parallel to the inner barrel 450 toward the rear of the body 100. In addition, the fixed vane 460 may be formed so that a width in a vertical direction increases toward the rear of the body 100.

By this form, as the exhaust gas injected from the combustor 200 is deflected toward the side of the body 100 by the guide member 300, the speed of the exhaust gas increases, so that the exhaust gas efficiently collides with the fixed vane 460. Here, there is an effect of obtaining an additional propulsive force by the fixed vane 460 in addition to the basic jet propulsive force by an impact force generated by colliding with the fixed vane 460.

Hereinafter, each embodiment of a form in which the jet propulsion engine 10 using discharged exhaust gas according to one embodiment of the present invention is coupled to an existing engine will be described.

FIG. 1A is a cross-sectional view of the jet propulsion engine 10 using discharged exhaust gas according to the first embodiment of the present invention, and is a view showing a flow path of exhaust gas together. According to the drawing, high thrust may be obtained even in a supersonic range through the rotation of the fan blade 420 in the exhaust gas injected at supersonic speed from a downstream jet nozzle at a far end of the engine.

The first embodiment of FIG. 1A takes a modified form of a turbofan engine in the most general form according to the principles of the present invention. That is, the guide member 300, the rotating shaft 410, and the fan blade 420 are coupled to a general turbofan engine.

Referring to FIG. 1A, a turbofan 1 according to one embodiment of the present invention has an outer shape similar to a general turbofan in outline, and is formed in a cylindrical shape in which external air is introduced through the front and exhaust gas is discharged through the rear.

As shown in FIG. 1A, the turbofan 1 according to one embodiment of the present invention includes the body 100, the combustor 200, a high-pressure turbine stage 610, a low-pressure turbine stage 620, the guide member 300, the rotating shaft 410, and the fan blade 420. A detailed description of each component is replaced with the above description.

Here, for the turbofan 1 of the present embodiment, a compressor 700 is disposed in front of the combustor 200 to forcibly compress atmospheric air supplied to the combustor 200. The compressor 700 includes a plurality of rotating blades and guide stages, and is rotated by a rotational force of the turbine stage 600.

At the rear of the combustor 200, the turbine stage 600 provided to be rotatable is disposed. The turbine stage 600 may include the high-pressure turbine stage 610 and the low-pressure turbine stage 620. In FIG. 1A, the high-pressure turbine stage 610 is shown as three stages, but the type and number of turbines are not limited thereto and may be modified in various forms.

The high-pressure turbine stage 610 has a form in which a plurality of blades are installed on a circumference of a rotating body, and is rotated at high speed by the high-temperature and high-pressure exhaust gas discharged from the combustor 200. The high-pressure turbine stage 610 operates the compressor 700 through a compressor rotating shaft 710 by converting linear kinetic energy of a fluid into useful mechanical rotational energy.

The low-pressure turbine stage 620 is positioned at the rear of the high-pressure turbine stage 610, and the exhaust gas passing through the high-pressure turbine stage 610 rotates the low-pressure turbine stage 620 positioned at the rear in a state in which speed and pressure are reduced. The low-pressure turbine stage 620 is coupled to the rotating shaft 410. Here, when the low-pressure turbine stage 620 coupled to one side of the rotating shaft 410 rotates, the fan blade 420 coupled to the other side of the rotating shaft 410 also rotates.

The exhaust gas that has left the low-pressure turbine stage 620 passes through the guide member 300, and in the guide member 300, the curve 310 is formed in a shape similar to that of the low-pressure turbine stage 620 and is disposed in a common direction.

In addition to a function of supporting the center of the low-pressure turbine stage 620 so that the low-pressure turbine stage 620 may rotate, the guide member 300 has the curve 310 formed so that each of frames faces the side rather than an axial flow unlike the related art. Along with a function of deflecting the lateral exhaust gas that has left the low-pressure turbine stage 620 in a lateral direction once again by the shape of the curve 310, the guide member 300 increases the injecting speed to supersonic speed, thereby making the exhaust gas into a strong vortex state in effect, so that the exhaust gas effectively and impactfully collides with the fan blade 420.

That is, referring to FIG. 1B, the exhaust gas that has left the low-pressure turbine stage 620 is injected at a laid-down angle of about −30° to −50° relative to a horizontal direction, and the guide member 300 deflects the injected exhaust gas to −40° to −70° and increases the speed so that the exhaust gas collides with the fan blade 420 most efficiently and impactfully.

In this case, since the lateral exhaust gas of Mach 2 to 3 that has left the guide member 300 is confined in the casing 110 provided in the body 100 to form a vortex in effect, and collides with the forward rotating fan blade 420 while exiting, the impact force is very high, and therefore, a considerable amount of additional propulsive force by the fan blade 420 may be obtained in addition to the basic jet propulsive force, and the speed may also be accelerated about twice according to the shape of the fan blade 420, reaching Mach 4 to 6.

The fan blade 420 is configured to have the curve 421 formed so that the direction of the fan blade 420 is substantially the same direction as the rear portion of the guide member 300 at the front portion of the fan blade 420, but becomes the same direction as the rotating shaft 410 toward the rear end thereof. Thereby, when the lateral exhaust gas that has left the guide member 300 is introduced to the front of the fan blade 420, the exhaust gas is naturally introduced with little friction, but then, as the exhaust gas goes to the rear, the friction gets greater and the speed increases, and thus there are effects of increasing the propulsive force and increasing the injecting speed.

The fan blade 420 has the curve 461 formed in the direction opposite to the shape of the curve 310 of the guide member 300 to accelerate the lateral exhaust gas discharged through the guide member 300 backward as quickly as possible, so that the direction of the fan blade 420 is substantially the same direction as the rear portion of the guide member 300 at the front portion of the fan blade 420 and becomes the same direction as the axial flow toward the rear end thereof, and thus the lateral exhaust gas exiting while forming the vortex collides with the fan blade 420 in the best condition.

It is preferable to limit the number of fan blades 420 to one. In the case of a plurality of fan blades 420, due to a shock wave generated when the front portion collides with the lateral exhaust gas pushed in at supersonic speeds of Mach 2 to 3, a large amount of energy loss occurs together with a phenomenon of a drop in efficiency, and thus in order to reduce the loss, it is preferable that the jet propulsion engine is constituted by one fan blade alone.

In addition, since in a state in which the exhaust gas laid down at −40° to −70° exits while forming the vortex, the exhaust gas is not able to sufficiently reach an entire surface of a rear element by being blocked by a front element, it is preferable to limit the number of fan blades 420 to one so that the exhaust gas may evenly reach the entire surface of the fan blade 420 by being constituted by the single fan blade 420.

In addition, by allowing the width to increase toward the rear, there is an effect of allowing a large amount of exhaust gas to smoothly exit.

Since when the present invention is implemented as a rotating body in which the fan blade 420 rotates by the rotational force of the low-pressure turbine stage 620, the single fan blade 420 vibrates due to weight imbalance, the counterweight 500 is installed on the inner surface of the rotor 120 opposite to the fan blade 420 so that the vibration is prevented.

The flow path of the exhaust gas shown in FIG. 1 and the single fan blade 420 show the best choice derived according to the above description.

As described above, since the lateral exhaust gas of Mach 2 to 3 collides with the fan blade 420 installed at the rear end of the engine, an enormous impact force is generated, and thereby, there are effects of obtaining high thrust even in the supersonic range and obtaining a large amount of propulsive force even in a narrow space.

Therefore, the propulsion method of the fan blade 420 may replace the turbofan or the large turboprop fan in the related art. In addition, for the after-burning turbojet having a high fuel consumption rate, there is an advantage in that it may be designed to be modified into a propulsion engine with a low fuel consumption rate.

FIG. 2A is a cross-sectional view of a jet propulsion engine 10 using discharged exhaust gas according to the second embodiment of the present invention, and shows a cross-sectional view of the ramjet and a flow path of exhaust gas together. That is, the guide member 300, the rotating shaft 410, and the fan blade 420 are coupled to a general ramjet.

As shown in FIG. 2A, a ramjet 2 according to one embodiment of the present invention includes a body 100, a combustor 200, a turbine stage 600, for example, a high-pressure turbine stage, a guide member 300, a rotating shaft 410, and a fan blade 420. A detailed description of each component is replaced with the above description. Further, the ramjet 2 includes a compression chamber 800.

Referring to FIG. 2A, the ramjet engine 2 according to one embodiment of the present invention has a shape similar to that of a general turbojet engine in which the forcing compressor installed at the front is removed.

Since a general ramjet is used for high-speed aviation, a ram effect is generated when air introduced through an intake is naturally compressed, and since the turbojet engine may also obtain the same ram effect as the ramjet engine at high speed when the compressor at the front is removed, the present invention utilizes such information.

Referring to FIG. 2A, the compression chamber 800 for naturally compressing air introduced by a forward force of the body 100 is installed at the front of the body 100.

The natural compressed air introduced through the compression chamber 800 is mixed with fuel in the combustor 200 and combusted. The combustion gas rotates the turbine stage 600 installed at the rear. Here, the turbine stage 600 may be a high-pressure turbine stage. In this case, since the rotating shaft 410 of the turbine stage 600 is to be positioned at a center of the body 100, the combustor 200 is disposed to be distributed around the rotating shaft 410 like a turbofan.

At the rear of the turbine stage 600, the guide member 300 is installed. In the guide member 300, a curve 310 is formed to be similar to the shape of the turbine stage 600 and is installed in the same direction as the turbine stage 600.

In addition to a function of supporting the center of the turbine stage 600 so that the turbine stage 600 may rotate, the guide member 300 has the curve 310 formed so that each of frames faces the side rather than an axial flow unlike the related art. Due to the shape of the curve 310, the lateral exhaust gas that has left the turbine stage 600 is deflected in a lateral direction once again and the speed of the exhaust gas is also increased so that the exhaust gas effectively and impactfully collides with the fan blade 420.

That is, the exhaust gas forms a strong vortex state, thereby effectively and impactfully colliding with the fan blade 420. At the rear of the guide member 300, the fan blade 420 is installed. The fan blade 420 is connected to the turbine stage 600 through the rotating shaft 410, and when the turbine stage 600 rotates, the fan blade 420 also rotates.

In addition, as described above, since the fan blade 420 serves to quickly push the supersonic lateral exhaust gas discharged through the guide member 300 backward, like the present embodiment, even in the ramjet engine 2, a propulsive force by the fan blade 420 may be additionally obtained in addition to the basic thrust by the exhaust gas.

In this case, since the lateral exhaust gas of Mach 2.5 to 3.5 that has left the guide member 300 is confined in the casing 110 provided in the body 100 to form a vortex in effect, and collides with the forward rotating fan blade 420 while exiting, the impact force is very high, and therefore, a considerable amount of additional propulsive force by the fan blade 420 may be obtained in addition to the basic jet propulsive force, and the speed may also be accelerated about twice according to the shape of the fan blade 420, reaching Mach 5 to 7.

Referring to FIG. 2B, the fan blade 420 is configured to have the curve 421 formed so that the direction of the fan blade 420 substantially the same direction as the rear portion of the guide member 300 at front portion of the fan blade 420, but becomes the same direction as the axial flow of the engine toward the rear end thereof. Thereby, when the lateral exhaust gas that has left the guide member 300 is introduced to the front of the fan blade 420, the exhaust gas is naturally introduced with little friction, but then, as the exhaust gas goes to the rear, the friction gets greater and the speed gets greater, and thus there are effects of increasing the propulsive force and increasing the injecting speed.

It is preferable to limit the number of fan blades 420 to one. In the case of a plurality of fan blades 420, due to a shock wave generated when the front portion collides with the lateral exhaust gas pushed in at supersonic speed, a situation where, in a state in which the exhaust gas laid down at −40° to −70° exits while forming the vortex, the exhaust gas is not able to sufficiently reach an entire surface of a rear element by being blocked by a front element occurs together with a phenomenon of a drop in efficiency, and thus it is preferable that the jet propulsion engine is constituted by the single fan blade 420 so that the exhaust gas may evenly reach the entire surface of the fan blade 420.

In addition, since due to the shock wave generated when the lateral exhaust gas of Mach 3 to 4 collides with the front portion of the fan blade 420, a large amount of energy loss as well as the drop in efficiency occurs, in order to reduce the energy loss, it is preferable that the jet propulsion engine is constituted by the single fan blade.

The fan blade 420 has the curve 421 formed in the direction opposite to the shape of the curve 310 of the guide member 300 to accelerate the lateral exhaust gas discharged through the guide member 300 backward as quickly as possible, so that the direction of the fan blade 420 is substantially the same direction as the rear portion of the guide member 300 at the front portion of the fan blade 420 and becomes the same direction as the axial flow toward the rear end thereof, and thus the lateral exhaust gas exiting while forming the vortex collides with the fan blade 420 in the best condition.

In addition, by allowing the width to increase toward the rear, there is an effect of allowing a large amount of exhaust gas to smoothly exit.

Since, when the present invention is implemented as a rotating body in which the fan blade 420 rotates by the rotational force of the turbine stage 600, the single fan blade 420 vibrates due to weight imbalance, the counterweight 500 is installed on the inner surface of the rotor 120 opposite to the fan blade 420 so that the vibration is prevented.

The flow path of the exhaust gas shown in FIG. 2 and the single fan blade 420 show the best choice derived according to the above description.

As described above, since the lateral exhaust gas of Mach 2.5 to 3.5 collides with the fan blade 420 installed at the rear end of the engine, an enormous impact force is generated, and thereby, there are effects of obtaining high thrust even in the supersonic range and obtaining a large amount of propulsive force even in a narrow space.

Therefore, the propulsion method of the fan blade 420 has an advantage in that the ramjet 2 may be designed to be modified into a propulsion engine superior in thrust and speed as compared to the ramjet having a simple structure with a high fuel consumption rate in the related art.

FIG. 3A is a cross-sectional view of a jet propulsion engine 10 using discharged exhaust gas according to the third embodiment of the present invention, and is a view showing a flow path of exhaust gas together.

Referring to FIG. 3A, a turbojet 3 of the present invention has an approximate appearance similar to the general afterburning turbojet structure. That is, a guide member 300 and a fixed vane 460 are coupled to the general after-burning turbojet engine.

Here, a shape of a body 100 may be modified in various forms depending on the type of engine and necessary parts, and is formed in a substantial cylindrical shape in which external air is introduced through the front and exhaust gas is discharged to the rear.

As shown in FIG. 3A, the turbojet 3 according to one embodiment of the present invention includes the body 100, a combustor 200, a turbine stage 600, for example, a high-pressure turbine stage, the guide member 300, and the fixed vane 460. A detailed description of each component is replaced with the above description. Further, the turbojet 3 includes a compressor 700.

The combustor 200 is installed in the body 100. The combustor 200 provides a space in which fuel may be injected to compressed air and combusted. In addition, the air and fuel combusted in the combustor 200 are ejected toward the rear as high-temperature, high-pressure, rapid exhaust gas.

In this case, for the turbojet 3 of the present embodiment, the compressor 700 is disposed in front of the combustor 200 for forcibly compressing atmospheric air supplied to the combustor 200. The compressor 700 includes a plurality of rotating blades and guide stages, and is rotated by a rotational force of the turbine stage 600.

At the rear of the combustor 200, the turbine stage 600 provided to be rotatable is disposed. In FIG. 3A, the turbine stage 600 is shown as three stages, but the type and number of turbines are not limited thereto and may be modified in various forms.

The turbine stage 600 has a form in which a plurality of blades are installed on a circumference of a rotating body, and is rotated at high speed by the high-temperature and high-pressure exhaust gas discharged from the combustor 200.

The turbine stage 600 operates the compressor 700 through a compressor rotating shaft 710 by converting linear kinetic energy of a fluid into useful mechanical rotational energy.

The exhaust gas that has left the turbine stage 600 passes through the guide member 300 positioned at the rear, and the guide member 300 has a function of supporting the center of the turbine stage 600 so that the turbine stage 600 may rotate, and also has a curve 310 formed so that each of frames faces the side rather than an axial flow like wings of the turbine stage 600. The shape of the curve 310 increases an injecting speed together with the function of deflecting the lateral exhaust gas that has left the turbine stage 600 in a lateral direction once again, so that the exhaust gas effectively and impactfully collides with the fixed vane 460.

That is, referring to FIG. 3B, the lateral exhaust gas that has left the turbine stage 600 is injected at a laid-down angle of about −30° to −50° relative to a horizontal direction, the guide member 300 deflects the injected exhaust gas to −40° to −70° and also increases its injecting speed to Mach 3 to 4, and a casing 110 confines the exhaust gas to be naturally released into the atmospheric air to form a vortex in effect, so that the exhaust gas collides with the fixed vane 460 most effectively and impactfully.

At the rear of the guide member 300, the fixed vane 460 is fixed to an inner barrel 450 installed in the body 100, and the lateral exhaust gas discharged through the guide member 300 collides with the fixed vane 460 at supersonic speed, and thereby a high propulsive force may be obtained according to the shape of the fixed vane 460.

That is, even though only one side of the exhaust gas collides, the impact force is very high, and therefore, a large amount of propulsive force may be obtained even in the supersonic range and a large amount of propulsive force may be obtained even in a narrow space.

The fixed vane 460 is configured to have the curve 461 formed so that the direction of the fixed vane 460 is substantially the same direction as the rear portion of the guide member 300 at the front portion of the fixed vane 460, but becomes the same direction as the axial flow of the engine toward the rear end thereof. Thereby, when the lateral exhaust gas that has left the guide member 300 is introduced into the front of the fixed vane 460, the exhaust gas is naturally introduced in with less friction, but then, as the exhaust gas goes to the rear, the impact gets greater and the speed increases, and thus the fixed vane 460 has an effect of obtaining a large amount of forward propulsive force without rotating, like a sail of a sailboat.

In this case, since the lateral exhaust gas of Mach 2.5 to 3.5 discharged from the guide member 300 is confined in the casing 110 provided in the body 100 to form a vortex in effect, and collides with the fixed vane 460 while exiting, the impact force is considerable although only one side of the exhaust gas collides, and there is an effect of obtaining a considerable amount of additional propulsive force by the fixed vane 460 in addition to the basic jet propulsive force without the fixed vane 460 rotating, like a sail of a sailboat.

It is preferable to limit the number of fixed vanes 460 to one. In the case of a plurality of fixed vanes 460, due to a shock wave generated when the front portion collides with the lateral exhaust gas pushed in at supersonic speed, a situation where, in a state in which the exhaust gas laid down at −40° to −70° exits while forming the vortex, the exhaust gas is not able to sufficiently reach an entire surface of a rear element by being blocked by a front element occurs together with a phenomenon of a drop in efficiency, and thus it is preferable to limit the number of fixed vanes 460 to one so that the exhaust gas may evenly reach the entire surface of the fixed vane 460 by installing the single fixed vane 460.

In addition, since due to the shock wave generated when the lateral exhaust gas of Mach 2 to 3 collides with the front portion of the fixed vane 460, a large amount of energy loss occurs, in order to reduce the energy loss, it is preferable that the jet propulsion engine is constituted by the single fixed vane.

The flow path of the exhaust gas shown in FIG. 3 and the single fixed vane 460 show the best choice derived according to the above description.

As described above, since the lateral exhaust gas of Mach 2.5 or 3.5 forms the vortex and collides with the fixed vane 460 installed at the rear end of the engine while exiting, an enormous impact force is generated even though only one side of the exhaust gas collides, and thereby, there are effects of obtaining high thrust even in the supersonic range and obtaining a large amount of propulsive force even in a narrow space.

The fixed vane 460 has the curve 461 formed in the direction opposite to the shape of the curve 310 of the guide member 300 to obtain additional thrust in the lateral exhaust gas discharged through the guide member 300, so that the direction of the fixed vane 460 is substantially the same direction as the rear portion of the guide member 300 at the front portion of the fixed vane 460 and becomes the same direction as the axial flow toward the rear end thereof, and thus the lateral exhaust gas exiting while forming the vortex collides with the fixed vane 460 in the best condition.

In addition, by allowing the width to increase toward the rear, there is an effect of allowing a large amount of exhaust gas to smoothly exit.

Therefore, the propulsion method of the fixed vane 460 has an advantage in that the after-burning turbojet with a high fuel consumption rate in the related art may be designed to be modified into a propulsion engine with a low fuel consumption rate by a simple method.

FIG. 4A is a cross-sectional view of a jet propulsion engine 10 using discharged exhaust gas according to the fourth embodiment of the present invention, and shows a cross-sectional view of the ramjet and a flow path of exhaust gas together. That is, a guide member 300 and a fixed vane 460 are coupled to a general ramjet.

A ramjet 4 according to one embodiment of the present invention has a shape similar to that of a general turbojet in which a front compressor and a rear turbine stage are removed.

As shown in FIG. 4A, the ramjet 4 according to one embodiment of the present invention includes a body 100, a combustor 200, the guide member 300, and the fixed vane 460. A detailed description of each component is replaced with the above description. Further, the ramjet 4 includes a compression chamber 800.

As described above, the general ramjet utilizes the ram effect in which air is naturally compressed by the forward force of the engine and does not require the separate compressor 700.

Referring to FIG. 4A, the compression chamber 800 for naturally compressing air introduced by a forward force of the body 100 is installed at the front of the body 100.

The natural compressed air introduced through the compression chamber 800 is mixed with fuel in the combustor 200 and combusted. At the rear of the combustor 200, the guide member 300 is installed. The guide member 300 in contact with the combustor 200 has a wing that has a shape similar to a wing of a general turbine stage, but whose latter part is laid sideways to deflect high-temperature, high-pressure combustion gas just discharged from the combustor 200 toward the side and make the combustion gas supersonic, so that the combustion gas effectively and impactfully collides with the fixed vane 460.

That is, the high-temperature, high-pressure combustion gas just produced in the combustor 200 is deflected to −40° to −70° so that the combustion gas becomes a supersonic exhaust gas of Mach 3 to 4, and the casing 110 confines the combustion gas to be naturally discharged into the atmospheric air to form a strong vortex in effect, so that the combustion gas effectively and impactfully collides with the fixed vane 460.

At the rear of the guide member 300, the fixed vane 460 is fixed to an inner barrel 450 installed in the body 100, and the lateral exhaust gas discharged through the guide member 300 collides with the fixed vane 460 at supersonic speed, and thereby a high propulsive force may be obtained according to the shape of the fixed vane 460.

In this case, since the lateral exhaust gas of Mach 3 to 4 discharged from the guide member 300 is confined in the casing 110 provided in the body 100 in a state in which the exhaust gas is naturally discharged into the atmospheric air to form a vortex state in effect, and collides with the fixed vane 460 while exiting, the impact force is considerable although only one side of the exhaust gas collides, and there is an effect of obtaining a considerable amount of additional propulsive force by the fixed vane 460 in addition to the basic jet propulsive force without the fixed vane 460 rotating, like a sail of a sailboat.

Referring to FIG. 4B, the fixed vane 460 is configured to have a curve 461 formed so that the direction of the fixed vane 460 is substantially the same direction as the rear portion of the guide member 300 at the front portion of the fixed vane 460, but becomes the same direction as the axial flow of the engine toward the rear end thereof. Thereby, when the lateral exhaust gas that has left the guide member 300 is introduced into the front of the fixed vane 460, the exhaust gas is naturally introduced in with less friction, but then, as the exhaust gas goes to the rear, the impact gets greater and the speed increases, and thus the fixed vane 460 has an effect of obtaining a large amount of additional propulsive force without rotating, like a sail of a sailboat.

It is preferable to limit the number of fixed vanes 460 to one. In the case of a plurality of fixed vanes 460, due to a shock wave of the front portion, a situation where, in a state in which the exhaust gas laid down at −40° to −70° exits while forming the vortex, the exhaust gas is not able to sufficiently reach an entire surface of a rear element by being blocked by a front element occurs together with a phenomenon of a drop in efficiency, and thus it is preferable to limit the number of fixed vanes 460 to one so that the exhaust gas may evenly reach the entire surface of the fixed vane 460 by installing the single fixed vane 460.

In addition, since the shock wave is generated when the lateral exhaust gas of Mach 3 to 4 collides with the front portion of the fixed vane 460 and thus a large amount of energy loss occurs due to a drop in efficiency, in order to reduce the energy loss, it is preferable that the jet propulsion engine is constituted by the single fixed vane.

The fixed vane 460 has the curve 461 formed in the direction opposite to the shape of the curve 310 of the guide member 300 to accelerate the lateral exhaust gas discharged through the guide member 300 backward as quickly as possible, so that the direction of the fixed vane 460 is substantially the same direction as the rear portion of the guide member 300 at the front portion of the fixed vane 460 and becomes the same direction as the axial flow toward the rear end thereof, and thus the lateral exhaust gas exiting while forming the vortex collides with the fixed vane 460 in the best condition.

In addition, by allowing the width to increase toward the rear, there is an effect of allowing a large amount of exhaust gas to smoothly exit.

The flow path of the exhaust gas shown in FIG. 4 and the single fixed vane 460 show the best choice derived according to the above description.

As described above, since the lateral exhaust gas of Mach 3 or 4 forms the vortex and collides with the fixed vane 460 installed in the ramjet 4 engine while exiting, an enormous impact force is generated even though only one side of the exhaust gas collides, and thereby, there are effects of obtaining the best thrust even in a very high supersonic range and obtaining a large amount of propulsive force even in a narrow space.

Therefore, the propulsion method of the fixed vane 460 has an advantage in that the simple ramjet with a high fuel consumption rate in the related art may be designed to be modified into a propulsion engine with a low fuel consumption rate by adding simple equipment.

Meanwhile, FIG. 5 shows the fan blade 420 of FIGS. 1 and 2 together with the rotor 120, and referring to FIG. 5, the fan blade 420 may be installed on an outer surface of the rotor 120 and the counterweight 500 for preventing vibration may be installed on an inner surface opposite to the fan blade 420.

As shown in FIG. 5, since the fan blade 420 pushes the supersonic exhaust gas introduced while the vortex is being formed by the the lateral exhaust gas discharged from the guide member 300 forward and discharges the supersonic exhaust gas to the rear in a state of being mounted on the outer surface of the rotor 120, a large amount of forward propulsive force is generated on a body surface of the fan blade 420 by the fan blade 420, and the speed is also accelerated by about twice according to the shape of the fan blade 420, so that there is an effect of obtaining high supersonic speed.

Here, since the supersonic exhaust gas is deflected to one side when the fan blade 420 is installed alone and vibration occurs when the fan blade 420 rotates, vibration caused by the fan blade 420 installed alone may be prevented by installing the counterweight 500 on the inner surface of the rotor 120 opposite to the fan blade 420 that does not affect the flow of exhaust gas.

In addition, FIG. 6 shows a state in which the fixed vane 460 of FIGS. 3 and 4 is mounted on the inner barrel 450, and when the vortex is formed by the lateral exhaust gas discharged from the guide member 300 in a state in which the fixed vane 460 is fixedly mounted on the outer surface of the inner barrel 450, there is an effect of obtaining a considerable propulsive force without rotation of the fixed vane 460 by the impact force generated when the exhaust gas collides with the fixed vane 460 while exiting.

Therefore, the embodiments of the present invention have the effect of minimizing the loss that may occur during rotation of the fan in the related art, because the supersonic exhaust gas is used as a propulsion medium to produce an additional forward propulsive force.

In addition, the embodiments of the present invention have effects of reducing the weight burden caused by a large fan used in turbofans or turboprops in the related art because the fan blade 420 may be installed in the body 100 without installing the large fan, and also significantly reducing resistance due to air friction during aircraft operation because the front area of the engine is reduced.

In addition, since this principle is also applied to the ramjet, so that, in addition to the propulsive force by simple exhaust gas ejection, the propulsive force by the fan blade 420 rotating in the exhaust gas may be additionally obtained or the propulsive force by the fixed vane 460 may be additionally obtained, the engine efficiency is increased, and thus the embodiments of the present invention have an effect of helping to save fuel and improve speed.

FIG. 7A is a cross-sectional view of the jet propulsion engine using discharged exhaust gas according to the fifth embodiment of the present invention, where a gearbox is further provided in the first embodiment of FIG. 1A, and FIG. 8A is a cross-sectional view of the jet propulsion engine using discharged exhaust gas according to the sixth embodiment of the present invention, where a gearbox is further provided in the second embodiment of FIG. 2A.

In the above-described first and second embodiments, the turbine stage 600 and the propulsive force providing means 400 are connected to one rotating shaft 410. Therefore, a rotational speed of the turbine stage 600 and a rotational speed of the propulsive force providing means 400 are the same, thereby recognizing the effects described in the first and second embodiments.

However, in the fifth and sixth embodiments, since a gearbox 910 is provided so that the rotational speed of the propulsive force providing means 400 is much faster than the rotational speed of the turbine stage 600, a hypersonic exhaust gas may be produced, and thereby, there is an effect of using the jet propulsion engine for a propulsion engine in a hypersonic range.

Referring to FIG. 7 regarding the fifth embodiment, when the turbine stage 600, for example, the low-pressure turbine stage 620 rotates, the gearbox 910 is increased two to three times more than the low-pressure turbine stage 620 according to a preset gear ratio, and thereby the propulsive force providing means 400 connected to the gearbox 910 rotates faster.

Here, referring to FIGS. 7A and 7B, the fan blade 420 of the propulsive force providing means 400 may be formed in a shape for accelerating a fluid about twice. Therefore, the fan blade 420 may be provided to accelerate the exhaust gas having the speed of Mach 2 to 3, which is to be naturally discharged into the atmosphere through the guide member 300 by the above-described shape, about twice, thereby increasing the speed of the exhaust gas to Mach 4 to 6, and naturally release the accelerated exhaust gas into the atmosphere.

In addition, as described above, since the fan blade 420 is set to rotate about two to three times faster than the rotational speed of the low-pressure turbine stage 620 by the gearbox 910 provided at the center of the guide member 300, as a result, the impact force with the exhaust gas may also be amplified two to three times, and the speed of the exhaust gas may also be increased two to three times, thereby producing a hypersonic exhaust speed of Mach 8 to 18.

That is, when calculating this arithmetically, Mach 2 to 3 (speed of the exhaust gas)×2 (magnification of the fan blade)×2 to 3 (rotational speed magnification of the gearbox) =an exhaust speed of Mach 8 to 18 may be produced. In other words, when Mach 2 to 3, which is the speed of the exhaust gas, is multiplied by 2, which is the magnification of the fan blade 420, and then multiplied by 2 to 3, which is the rotational speed magnification of the gearbox 910, the exhaust speed of Mach 8 to 18 may be produced.

Therefore, it is possible to produce a much higher discharging speed even if less fuel is used than fuel normally used, thereby producing exhaust gas in the hypersonic range, which cannot be obtained by current technology, and thus there is an effect of being useful for an efficient propulsion engine of the hypersonic range.

As another embodiment, referring to FIG. 8 related to the sixth embodiment, when the turbine stage 600, for example, a high-pressure turbine stage rotates, the propulsive force providing means 400 is increased two or three times by the gearbox 910 and rotates at a much higher speed.

Here, referring to FIGS. 8A and 8B, the fan blade 420 of the propulsive force providing means 400 may be formed in a shape for accelerating a fluid about twice. Therefore, the fan blade 420 may be provided to accelerate the exhaust gas having the speed of Mach 2 to 3, which is to be naturally discharged into the atmosphere through the guide member 300 by the above-described shape, about twice, thereby increasing the speed of the exhaust gas to Mach 4 to 6, and naturally release the accelerated exhaust gas into the atmosphere.

In addition, as described above, since the fan blade 420 is set to rotate about two to three times faster than the rotational speed of the turbine stage 600 by the gearbox 910 provided at the center of the guide member 300, as a result, the impact force with the exhaust gas may also be amplified two to three times, and the speed of the exhaust gas may also be increased two to three times, thereby producing a hypersonic exhaust speed of Mach 8 to 18.

That is, when calculating this arithmetically, Mach 2 to 3 (speed of the exhaust gas)×2 (magnification of the fan blade)×2 to 3 (rotational speed magnification of the gearbox) =an exhaust speed of Mach 8 to 18 may be produced. In other words, when Mach 2 to 3, which is the speed of the exhaust gas, is multiplied by 2, which is the magnification of the fan blade 420, and then multiplied by 2 to 3, which is the rotational speed magnification of the gearbox 910, the exhaust speed of Mach 8 to 18 may be produced.

Therefore, it is possible to produce a much higher discharging speed even if less fuel is used than fuel normally used, thereby producing exhaust gas in the hypersonic range, which cannot be obtained by current technology, and thus there is an effect of being useful for an efficient propulsion engine of the hypersonic range.

It should be noted that descriptions of configurations, actions, and effects common to each embodiment may be applied to other embodiments even if omitted.

The present invention has been described with regard to a limited number of embodiments and drawings, but the present invention is not limited thereto and it is obvious to those skilled in the art that various modifications and changes may be made thereto within the technical aspects of the present invention and the equivalent scope of the appended claims.

INDUSTRIAL APPLICABILITY

The present invention relates to a jet propulsion engine using discharged exhaust gas, and can be used in industries related to the jet propulsion engine using discharged exhaust gas.

The invention claimed is:

1. A jet propulsion engine comprising:
a body defining an axis;
a combustor mounted in the body and configured to inject fuel into compressed air and combust the fuel;
a turbine stage disposed at a rear of the combustor and configured to laterally discharge the exhaust gas at an angle of −30° to −50° relative to the axis;
a guide member positioned downstream of the turbine stage, the guide member being configured to further laterally deflect the exhaust gas from the turbine stage to an angle of −40° to −70° relative to the axis, such that the deflected exhaust gas forms a vortex within the body; and
a single propulsive force providing means positioned at a rear of the guide member and configured to provide propulsive force by colliding with the vortex of exhaust gas guided by the guide member,
wherein the propulsive force providing means comprises:
a rotating shaft; and
a single fan blade provided at the rear of the guide member, coupled to the rotating shaft, and shaped to become more parallel to the rotating shaft toward a rear of the body, such that the exhaust gas deflected by the guide member collides with the single fan blade to produce additional thrust.

2. The jet propulsion engine of claim 1, wherein the guide member has a curve formed toward a side of the body so that the exhaust gas is directed toward the side of the body, and the single fan blade has a curve formed in a direction opposite to the curve of the guide member so that the exhaust gas guided by the guide member collides with the single fan blade and flows toward a rear of the body.

3. The jet propulsion engine of claim 1, wherein the single fan blade is formed so that a width increases toward the rear of the body.

4. The jet propulsion engine of claim 1, further comprising a counterweight coupled to the rotating shaft and rotating at a position facing the single fan blade.

5. The jet propulsion engine of claim 1, further comprising a turbine stage disposed at a rear of the combustor and configured to rotate.

6. The jet propulsion engine of claim 5, wherein the turbine stage includes:

a high-pressure turbine stage configured to rotate by the exhaust gas discharged from the combustor; and a low-pressure turbine stage configured to rotate by exhaust gas passing through the high-pressure turbine stage and coupled to the rotating shaft.

7. The jet propulsion engine of claim 5, further comprising a compressor disposed in front of the combustor to forcibly compress atmospheric air supplied to the combustor.

8. The jet propulsion engine of claim 1, further comprising a compression chamber configured to naturally compress air introduced into the body by a forward force of the body.

9. The jet propulsion engine of claim 5, further comprising a compression chamber configured to naturally compress air introduced into the body by forward motion of the body.

10. The jet propulsion engine of claim 1, comprising a gearbox provided on the guide member.

11. The jet propulsion engine of claim 10, comprising a cover surrounding the gearbox.

* * * * *